United States Patent Office 3,132,095
Patented May 5, 1964

3,132,095
PROCESS FOR THE SEPARATION OF AN ACID FROM A NON-ACIDIC COMPONENT
Friedrich Wolf, Leipzig, and Reinhard Bachmann, Engelsdorf, near Leipzig, Germany, assignors to VEB Farbenfabrik Wolfen, Bitterfeld, Germany
No Drawing. Filed Nov. 16, 1960, Ser. No. 69,577
7 Claims. (Cl. 210—23)

The present invention relates to a process for separating acids from salts or non-electrolytic substances, which are together in a solution, for instance in water.

Separation of acids or acidic substances is often required in technical processes, either in the recovery of acids or in processes of purification. One way to proceed is to separate the acid, which is frequently the more volatile compound, by distillation. However, for this purpose, complicated corrosion-resistant apparatuses are necessary and high consumption of energy is involved. These factors make the process uneconomical. It is another drawback that many salts are decomposed by hydrolysis in the heat.

According to another method it is possible to separate the salts by freezing them out of the solution. This, however, requires special conditions of concentration and highly favorable conditions for crystallization. Moreover, separation is never quantitative when accomplished by this method.

It is the object of the present invention to provide a method of separation of the acid from the non-acidic components present in a solution which is accomplished by simple and inexpensive operations.

It is another object of the invention to provide a method by which said separation is as quantitative as possible.

Other objects and advantages of the invention will become apparent from the following detailed description.

In accordance with the invention an almost complete separation of the acidic and the non-acidic components present in solution in a liquid can be achieved by allowing the acidic component to diffuse from the solution into a medium which takes up said component through a membrane made of an anion-selective exchanger. Under conventional conditions of diffusion acids diffuse about 2 to 3 times as fast as salts, when conditions of temperature and concentration are equal. However, when an anion-selective foil or membrane is interposed between the concentrated and the diluted solution in the concentration-diffusion of salts and acids, the separation effect becomes 10–15 times greater than in the free concentration diffusion due to the separation effect of the specific composition of the membrane. If the salt concentration in the salt/acid diffusion is below 0.5 equivalent/liter, the acid may be separated from the salt completely, since under those conditions the salt will not diffuse through the membrane at all.

Examples or acids to be separated in this manner are strong acids e.g. HCl, $H_2SO_4$, and $HNO_3$; examples for salts $NaCl$, $MgCl_2$, $CaCl_2$, $KCl$, $MgSO_4$, an $NaNO_3$. Especially good separation effects are obtained, when the salt contains a bivalent cation. The separation of acids by membrane dialysis may also be extended to large-molecule non-electrolytes, which have low diffusion tendency or none at all, for instance glycerol or other organic compounds having several C-atoms in the molecule.

As membranes we may use all those which consist of anion-selective resins. These are the known membranes made of suitable condensation or polymerization resins into which aliphatic, aromatic, or heterocyclic amines have been incorporated. Very suitable are for instance the anion exchange resins made of copolymers on the basis of styrene, chlorostyrene, alkylstyrene and/or alkoxystyrene and a cross linking agent e.g. divinyl benzene or butadiene, and whereby the polymerization has been effected on a fabric consisting of glass fibers or a plastic fabric, e.g. between two flat plates, with subsequent chloromethylation and amination.

In the following, preparation of an anion-selective membrane is illustrated by way of example.

Example 1

97 parts by weight of styrene and 3 parts by weight of divinyl benzene are subjected to co-polymerization at a temperature ranging from 60–80° C with the addition of 1% by weight of benzoyl peroxide for 48 hours. The polymerization is allowed to proceed in the manner mentioned above between flat plates, from which the membranes may be taken off when the polymerization is complete. The membranes are then immersed in a solution containing about 8% by weight of monochlorodimethyl ether in low boiling gasoline, in the presence of 0.3% $SnCl_4$ as a catalyst, at a temperature of about 45° C. The chloromethylation is terminated after about 12 hours. Finally, the membranes are treated with a 5% aqueous solution of methylamine at temperatures of 15° C.

In a similar manner we may prapare an anion-selective membrane from a copolymer of a substituted styrene e.g. alkyl styrene or alkoxystyrene with divinyl-benzene.

In general, the membranes described in the assignee's co-pending application Serial No. 69,576, filed concurrently with the present application are very well suited for carrying out the process of the invention.

The device for separating the acids corresponds exactly to those known for dialytic separations. The anion-selective membranes are preferably arranged in a manner of filter presses, in order to obtain as large an active surface as possible. It is also advisable to convey the solution for dialysis and the solvent into which the acid is to diffuse, in countercurrent past the membranes.

The effect of the acid separation will be illustrated in the following examples, but it should be understood that these are given by illustration and not by limitation and that many changes in the details can be made without departing from the spirit of the invention.

Example 2

An acid is to be separated from a salt in an apparatus in which membranes are arranged in the manner of filter cloth on frames of a filter press. Past the membranes, the solution containing the components to be separated and pure water are alternately passed in countercurrent. The anion-permeable membranes which were 0.075 cm. in thickness, consisted of a polymerization product of styrene and 3% by weight of divinyl benzene as a cross linking agent such as described in Example 1; the solution subjected to dialysis was 2 N both for NaCl and HCl.

During the dialysis process, 1.4 mols HCl pass through the membranes per hour and per square meter. The amount of NaCl passing therethrough during the same time and the same square area is only 0.07 mol.

Consequently, the solution is brought up to an HCl content which is 20 times as large as that of the starting solution.

Example 3

The dialysis of a solution containing 2N HCl and 0.5 N NaCl is carried out in the same manner as mentioned in Example 1.

In this case, no NaCl passes through the membrane, while HCl passes through at the rate of 1.48 mols per hour and square meter.

Example 4

A solution is subjected to dialysis as described in

Example 1, which solution consists of 2 N $H_2SO_4$ and 2 N $MgSO_4$.

Passage of $H_2SO_4$ through the membrane: 0.39 equivalent/m.$^2$hr.
Passage of $MgSO_4$ through the membrane: 0.0175 equivalent/m.$^2$hr.
$H_2SO_4$ is brought up to the 22 fold amount.

*Example 5*

The solution which is to be dialysed, contains 2 N glycerol and 2 N $H_2SO_4$.

Passage of $H_2SO_4$: 0.36 mol per hour and sq. meter
Passage of glycerol 0.034 mol per hour and square meter
$H_2SO_4$ is brought up to the 11 fold amount.

It should be understood, of course, that the foregoing disclosure relates only to preferred embodiments of the invention and that it is intended to cover all changes and modifications of the examples described which do not constitute departures from the spirit and scope of the invention as set forth in the appended claims.

What is claimed is:

1. A process for the separation of an acid from a non-acidic component present in molecular dispersion in a solution with said acid, which comprises subjecting the solution to a diffusion process through at least one membrane consisting of an anion-exchanging resin of the type being a member selected from the group consisting of condensation and polymerization resins into which amino groups have been incorporated, said diffusion process being conducted in the absence of an electric potential being applied with attendant electrolysis in the solution.

2. The process according to claim 1, wherein said solution is passed through a plurality of membranes arranged in the manner of filter layers in a filter press.

3. The process according to claim 1, wherein the non-acidic component is an inorganic salt.

4. The process according to claim 3, wherein the non-acidic component is an inorganic salt having a bivalent cation.

5. The process according to claim 1, wherein the non-acidic component is a non-electrolyte of low diffusion tendency.

6. The process according to claim 5, wherein the non-acidic component is a large-molecular organic compound of a molecular size in the order of glycerol.

7. The process according to claim 1, wherein the membrane consists of an anion exchange resin consisting of a copolymerization product of a monomer selected from the group consisting of styrene, chlorostyrene, alkyl styrene and alkoxy styrene, as basic constituents, and a cross linking agent selected from the group consisting of divinyl benzene and butadiene, said polymerization product being subjected to chloromethylation and amination.

References Cited in the file of this patent

UNITED STATES PATENTS

| | | |
|---|---|---|
| 2,276,210 | Lane et al. | Mar. 10, 1942 |
| 2,405,456 | Signer | Aug. 6, 1946 |
| 2,591,574 | McBurney | Apr. 1, 1952 |
| 2,681,319 | Bodamer | June 15, 1954 |
| 2,800,445 | Clarke | July 23, 1957 |
| 2,900,352 | Patterson et al. | Aug. 18, 1959 |

FOREIGN PATENTS

| | | |
|---|---|---|
| 182,246 | Germany | Mar. 7, 1907 |
| 725,487 | Germany | Sept. 23, 1942 |

OTHER REFERENCES

Industrial and Engineering Chemistry (periodical), vol. 47, No. 6, June 1955, article by Horner et al., pp. 1121–1129 (copy in Scientific Library).